May 23, 1967  R. L. SIDLE ET AL  3,321,228

LATCH

Filed Dec. 28, 1964

INVENTORS
Robert L. Sidle
Earl Reid
BY Carl A. Stickel
Their Attorney

United States Patent Office 3,321,228
Patented May 23, 1967

3,321,228
LATCH
Robert L. Sidle and Earl Reid, Dayton, Ohio, assignors to General Motors Corporation, Detroit, Mich., a corporation of Delaware
Filed Dec. 28, 1964, Ser. No. 421,404
3 Claims. (Cl. 292—74)

ABSTRACT OF THE DISCLOSURE

In the preferred form, this latch has a molded plastic bolt member formed of a head with integral thin wide parallel resilient arms extending in the same direction from the head. These resilient arms have parallel slots receiving projections extending outwardly from the opposite faces of a molded rectangular block having parallel guide flanges extending along the opposite edges of said arms. A coil spring extends between the arms and has its opposite ends supported upon pin-shaped projections extending from the head and the block toward each other.

---

Figure 1:
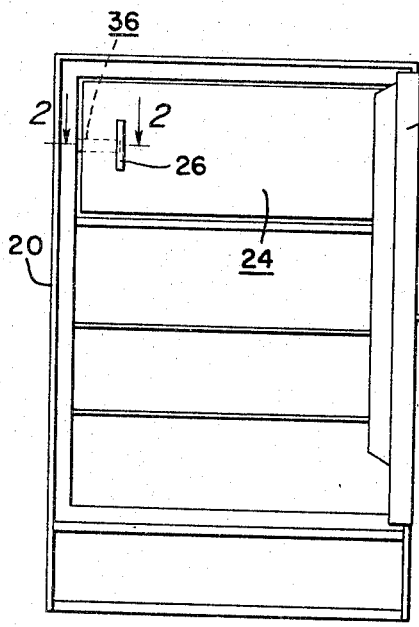

This invention pertains to latches and more particularly to very simple inexpensive spring latches.

Although latches have been used for centuries, there has been considerable effort made to produce smoother operations, more durable and less expensive latches. Because of the large usage and intense competition, improvements in operation, durability, convenience and appearance, as well as minor reductions in cost become abnormally important.

It is an object of this invention to provide a latch which is exceptionally simple, inexpensive, easy to manufacture, assemble, install and adjust.

It is another object of this invention to provide a latch having readily molded inexpensive, easily assembled, plastic parts as its principal components.

It is another object of this invention to provide a latch with a simple inexpensive housing arrangement which provides a simple, satisfactory, positive adjustment.

These and other objects are attained in the form shown in the drawings in which a plastic bolt member of resilient plastic has extending from its head two thin resilient parallel arms with longitudinal slots in the arms hooked over and receiving oppositely extending projections from a plastic anchor block. The anchor block is also provided with slide ways for the arms as well as a pin projecting toward the bolt member for supporting one end of a compression-type coil spring. The opposite end of the coil spring is supported by a pin on the inner side of the bolt head extending toward the anchor block. The latch is readily assembled by placing the coil spring between the bolt head and an anchor block on the spring supporting pins and spreading the two arms of the bolt member until they pass over the oppositely extending projections on the anchor block until the projections are registered with the slots in the arms. The latch assembly is housed in a latch housing in a plastic door. The wall of the housing on the inner face of the door is provided with a longitudinal adjusting slot through which an adjustable anchoring screw is passed and threaded into the anchoring block. Preferably the screw is a self-tapping type so that the anchor block can be readily molded by injection molding with a plain hole for the screw.

Further objects and advantages of the present invention will be apparent from the following description, reference being had to the acompanying drawings wherein a preferred embodiment of the present invention is clearly shown.

Figure 2:
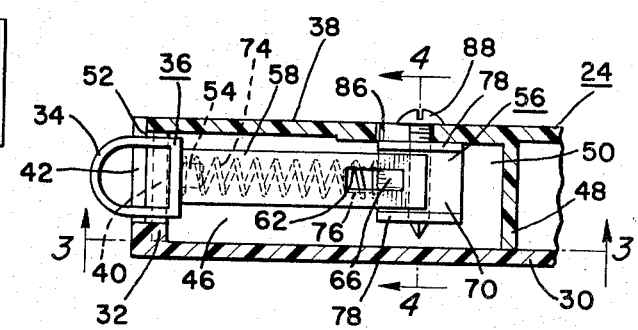
Figure 3:
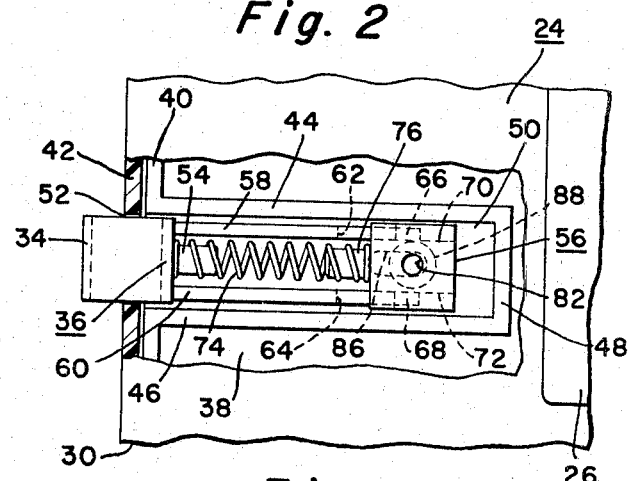
Figure 4:
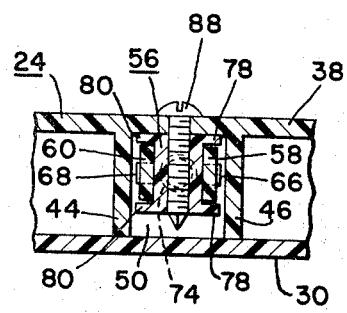
Figure 5:
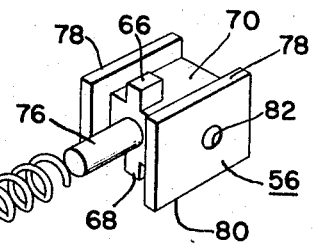
Figure 5:
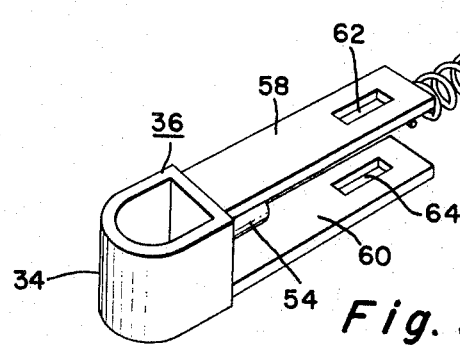

In the drawings:
FIG. 1 is a front view of a refrigerator cabinet with the outer door open showing the upper inner door provided with a latch assembly and housing embodying one form of our invention;
FIG. 2 is a fragmentary horizontal sectional view taken along the line 2—2 of FIG. 1;
FIG. 3 is a transverse sectional view taken along the line 3—3 of FIG. 2;
FIG. 4 is a vertical sectional view transverse to FIGS. 2 and 3; and
FIG. 5 is an exploded perspective view of the latch assembly.

Referring now to the drawing and more particularly to FIG. 1, there is illustrated a household refrigerator cabinet 20 provided with an outer door 22 and an inner door 24 provided with a handle 26. As better shown in FIGS. 2 to 4, the inner door is composed of an outer plastic member 30 generally in the form of a rectangular flanged injection molded sheet having a notch 32 extending on one side of the head 34 of a bolt member 36. The door 24 also includes an inner plastic injection molded member 38 having out turned flanges 40 which nest with the in turned flanges 42 of the outer member 30 to complete the door structure. The inner plastic member 38 also provides walls 44 and 46 on opposite sides of the latch assembly and a wall 48 at the inner end to provide a latch chamber 50 extending to the notch 32 at the edge of the door wherein there is provided registered openings 52 in both sets of flanges of the plastic member 30 and 38. The bolt head 34 projects through the registered apertures 52 normally into engagement with a suitable keeper (not shown) which is normally provided on the adjacent outer wall of the refrigerator.

The bolt member 36 is preferably injection molded of nylon and the head 34 is made hollow and has a rounded or semi-cylindrical outer nose for cooperation with the keeper. The rear face of the head is flat and carries a spring supporting pin 54 which projects toward the interior of the door and the plastic anchor block 56. A small light compression type coil spring 74 is placed on the pin 54 and a corresponding pin 76 projecting from the adjacent face of the anchor block 56. The bolt member 36 is also provided with long flat integral arms 58 and 60 provided with registering longitudinal slots 62 and 64. The bolt member 36 is preferably injection molded in one piece with the pin 54, the arms 58 and 60 and the head 34 being integral. The arms 58 and 60 are normally in the position shown in FIG. 5 when they are in the unstressed state. The wide flat relatively thin shape of the arms and the resiliency of the nylon material makes it possible to spread the inner ends of the arms 58 and 60 so that they will pass over the oppositely extending projections 66 and 68 on the upper and lower face 70 and 72 of the anchor block 56. The arms 58 and 60 in their unstressed state naturally hold the anchor block 56 between them. The anchor block 56 is also provided with upper and lower sets of guide projections 78 and 80 extending along the opposite sides of the arms 56 and 60. The arms slide smoothly between these guide projections 78 and 80 with the movement controlled by the presence of the projections 66 and 68 in the slots 62 and 64. The nylon material contributes to the ease of relative movement and minimizes friction without any lubrication. The spring 74 continuously urges the bolt member 36 outwardly away from the anchor block 56 but this outward movement is limited by the presence of the projections 66 and 68 in the slots 62 and 64 which constitute a lost motion connection. The inward movement is likewise limited by the projection and slot arrangement. The slots 62 and 64 are longitudinal and parallel with the arms 58 and 60.

The anchor block 56 is provided with a central hole 82 preferably molded in the block which is transverse to the projections 66 and 68. The latch assembly illustrated in FIG. 5, after being assembled, is then installed in the housing formed in the door by the walls 44 and 46 and 48 as well as the face walls of the plastic door members 30 and 38. The inner plastic member 38 is provided with a slot 86 which is parallel to the bolt member 36. Through this slot extends a self-tapping screw 88 which threads itself into the hole 82 to adjustably anchor the anchor block 56. The screw 88 may be loosened at any time so that the anchor block 56 may be moved inwardly or outwardly within the limits of the slot 86 so as to adjust the position of the bolt head so as to provide a proper amount of engagement with the keeper. Instead of using a self tapping screw, the hole 82 may be tapped.

The housing within the door as well as the registered apertures 52 assure the proper housing and location of the latch assembly while the adjusting screw and slot arrangement provides a very convenient method of adjustably anchoring the latch assembly in place. The latch assembly is very simple and made of an injected molded bolt member of plastic and an injected molded anchoring block each of which provides an anchorage for the compression spring. The anchoring block has a hole for the self-tapping adjusting screw. The latch is easy to assemble since all that is necessary is to place the spring 74 upon the pins 54 and 76 and to spread the arms 58 and 60 until they pass over the projection 66 and 68 with the projections entering the slots 62 and 64. The plastic nylon material has very low friction characteristics and is very durable and resilient providing smooth operation without maintenance and without any necessity for lubrication.

While the embodiment of the present invention as herein disclosed constitutes a preferred form, it is to be understood that other forms might be adopted.

We claim:

1. A latch assembly including a bolt member having a head and two arms extending in the same general direction from the head, said arms having parallel longitudinally extending slots, a second member having projections extending into said slots wherein the improvement comprises having said second member generally in the form of a rectangular block with said projections extending outwardly in opposite directions therefrom, said second member also having guide flanges extending along and parallel to the opposite edges of said two arms.

2. A latch assembly as defined in claim 1 in which the head of said bolt member and said second member have third and fourth projections located between and substantially parallel to said arms extending toward each other, and a coil spring between said arms having its ends surrounding said third and fourth projections.

3. A latch assembly as defined in claim 1 in which said two arms are wide and relatively thin and resilient and in their low stress state extend substantially in contact with opposite faces of said second member.

References Cited by the Examiner
UNITED STATES PATENTS

| | | | |
|---|---|---|---|
| 2,707,120 | 4/1955 | Loeb | 292—75 |
| 2,727,773 | 12/1955 | Hagstrom | 292—169 |
| 2,813,737 | 11/1957 | Reiter | 292—74 |

MARVIN A. CHAMPION, *Primary Examiner.*

J. R. MOSES, *Assistant Examiner.*